United States Patent
Feng

(10) Patent No.: US 9,769,849 B2
(45) Date of Patent: Sep. 19, 2017

(54) SYSTEM PARAMETER OPTIMIZATION FOR DELAYED CHANNEL ACCESS PROTOCOL

(71) Applicant: Macau University of Science and Technology, Macau (MO)

(72) Inventor: Li Feng, Macau (MO)

(73) Assignee: Macau University of Science and Technology, Macau (MO)

( * ) Notice: Subject to any disclaimer, the term of this patent is extended or adjusted under 35 U.S.C. 154(b) by 204 days.

(21) Appl. No.: 14/840,139

(22) Filed: Aug. 31, 2015

(65) Prior Publication Data

US 2017/0048887 A1   Feb. 16, 2017

Related U.S. Application Data

(60) Provisional application No. 62/202,913, filed on Aug. 10, 2015.

(51) Int. Cl.
| | |
|---|---|
| *H04J 3/16* | (2006.01) |
| *H04L 12/42* | (2006.01) |
| *H04W 74/08* | (2009.01) |
| *H04W 84/12* | (2009.01) |

(52) U.S. Cl.
CPC ........ *H04W 74/0816* (2013.01); *H04W 84/12* (2013.01)

(58) Field of Classification Search
CPC ............................................. H04W 74/0816
See application file for complete search history.

(56) References Cited

U.S. PATENT DOCUMENTS

| | | | | |
|---|---|---|---|---|
| 7,123,627 B2* | 10/2006 | Kowalski | ............ | H04L 12/2838 370/337 |
| 8,085,806 B2* | 12/2011 | Boer | ................... | H04L 27/0012 370/445 |
| 8,169,941 B2* | 5/2012 | Cavalcanti | ............ | H04W 74/04 370/230 |

(Continued)

OTHER PUBLICATIONS

IEEE Std. 802.11-2007, Part 11: Wireless LAN Medium Access Control (MAC) and Physical Layer (PHY) Specifications (Jun. 2007).

(Continued)

*Primary Examiner* — Gerald Smarth
(74) *Attorney, Agent, or Firm* — Spruson & Ferguson (Hong Kong) Limited

(57) ABSTRACT

A method for enabling one or more nodes to communicate with an access point (AP) according to a CSMA/CA protocol is provided. In one embodiment of the method, when the individual node enters into a state of having at least one packet of data to be transmitted to the AP, the individual node waits for a non-zero deterministic delay so that any packet arrived during the delay is allowed to be aggregated and transmitted upon one transmission opportunity, thereby improving channel utilization. The delay is determined such that a predicted system throughput is maximized. It is found that the system throughput is significantly affected by the relationship between the delay and the number of the one or more nodes. Hence, the delay is advantageously determined according to the number of the one or more nodes. After the delay expires, the individual node initiates a contending procedure.

20 Claims, 10 Drawing Sheets

Delayed DCF

(56) References Cited

U.S. PATENT DOCUMENTS

| | | | | |
|---|---|---|---|---|
| 8,537,791 B2* | 9/2013 | Seok | ................ | H04W 74/0816 370/337 |
| 8,634,336 B2* | 1/2014 | Kang | ................... | H04B 7/0452 370/311 |
| 8,867,512 B2* | 10/2014 | Li | ........................ | H04W 8/005 370/328 |

OTHER PUBLICATIONS

Bianchi, G.: Performance analysis of the IEEE 802.11 distributed coordination function. IEEE Journal on Selected Areas in Communications, 18(3), 535-547 (Mar. 2000).

Changwen, L., and Stephens, A.: Delayed channel access for IEEE 802.11e Based WLAN. IEEE International conference on Communications, pp. 4811-4817 (Jun. 2006).

Corlessa, R.M., Gannet, G.H., Hare, D.E.G., Jeffrey, D.J., and Knuth, D.E.: On the Lambert W function. Adv. Comput. Math., 5, 329-359 (1996).

Gong, M., Hart, B., and Mao, S.: Advanced wireless LAN technologies: IEEE 802.11ac and beyond. ACM Mobile Computing and Communications Review (MC2R), 18(4), 48-52 (Oct. 2014).

Kumar, A., Altman, E., Miorandi, D., and Goyal, M.: New insights from a fixed point analysis of single cell IEEE 802.11 WLANs. IEEE/ACM Transactions on Networking, 15(3), 588-601 (Mar. 2007).

Malone, D., Duffy, K., and Leith, D.: Modeling the 802.11 distributed coordination function in non-saturated heterogeneous conditions. IEEE/ACM Transactions on Networking, 15(1), 159-172 (Feb. 2007).

Sakurai, T., and Vu, H.L.: Access delay of the IEEE 802.11 MAC protocol under saturation. IEEE Transaction on Wireless Communications, 6(5), 1702-1710 (May 2007).

Siddiqui, F., Zeadally, S., and Salah, K.: Gigabit wireless networking with IEEE 802.11ac: technical overview and challenges. Journal of Networks, 10(3), 164-171 (Mar. 2015).

Zhao Q., Ma, Z., and Dai, H.: Performance evaluation of the delayed-DCF scheme in wireless LANs. International Journal of Future Computer and Communication, 2(5), 391-394 (Oct. 2013).

\* cited by examiner

SYSTEM PARAMETER OPTIMIZATION FOR DELAYED CHANNEL ACCESS PROTOCOL

CROSS-REFERENCE TO RELATED APPLICATIONS

This application claims the benefit of U.S. Provisional Patent Application No. 62/202,913, filed on Aug. 10, 2015, which is incorporated by reference herein in its entirety.

LIST OF ABBREVIATIONS

ACK acknowledgement
BEB binary exponential backoff
CSMA/CA carrier sense multiple access with collision avoidance
CTS clear to send
CW contention window
DCA delayed channel access
DCF distributed coordination function
DIFS DCF interframe space
HOL head of line
MAC media access control
RTS request to send
SIFS short interframe space
WLAN wireless local area network

BACKGROUND

Field of the Invention

The present invention generally relates to a contention-based MAC protocol for enabling one or more nodes to communicate with an AP in a wireless system such as a WLAN. In particular, the present invention relates to a DCA protocol in which a normal contending procedure is initiated after a non-zero deterministic delay expires.

LIST OF REFERENCES

There follows a list of references that are occasionally cited in the specification. Each of the disclosures of these references is incorporated by reference herein in its entirety.
 [1] IEEE Std. 802.11-2007, Part 11: Wireless LAN Medium Access Control (MAC) and Physical Layer (PHY) Specifications (June 2007).
 [2] Bianchi, G.: Performance analysis of the IEEE 802.11 distributed coordination function. *IEEE Journal on Selected Areas in Communications,* 18(3), 535-547 (March 2000).
 [3] Changwen, L., and Stephens, A.: Delayed channel access for IEEE 802.11e Based WLAN. *IEEE International Conference on Communications,* pp. 4811-4817 (June 2006).
 [4] Corlessa, R. M., Gonnet, G. H., Hare, D. E. G., Jeffrey, D. J., and Knuth, D. E.: On the Lambert W function. *Adv. Comput. Math.,* 5, 329-359 (1996).
 [5] Gong, M., Hart, B., and Mao, S.: Advanced wireless LAN technologies: IEEE 802.11ac and beyond. *ACM Mobile Computing and Communications Review (MC2R),* 18(4), 48-52 (October 2014).
 [6] Kumar, A., Altman, E., Miorandi, D., and Goyal, M.: New insights from a fixed point analysis of single cell IEEE 802.11 WLANs. *IEEE/ACM Transactions on Networking,* 15(3), 588-601 (March 2007).
 [7] Malone, D., Duffy, K., and Leith, D.: Modeling the 802.11 distributed coordination function in non-saturated heterogeneous conditions. *IEEE/ACM Transactions on Networking,* 15(1), 159-172 (February 2007).
 [8] Sakurai, T., and Vu, H. L.: Access delay of the IEEE 802.11 MAC protocol under saturation. *IEEE Transaction on Wireless Communications,* 6(5), 1702-1710 (May 2007).
 [9] Siddiqui, F., Zeadally, S., and Salah, K.: Gigabit wireless networking with IEEE 802.11ac: technical overview and challenges. *Journal of Networks,* 10(3), 164-171 (March 2015).
 [10] Zhao, Q., Ma, Z., and Dai, H.: Performance evaluation of the delayed-DCF scheme in wireless LANs. *International Journal of Future Computer and Communication,* 2(5), 391-394 (October 2013).

Description of Related Art

IEEE 802.11-based WLANs [1] have been widely deployed and will become increasingly popular. In the IEEE 802.11 DCF, each node is limited to send at most one data packet upon each transmission opportunity. This limitation badly lowers down channel utilization. Therefore, the DCA protocol has been proposed in [3]. The basic idea of the DCA protocol is that a node first waits for an extra random delay before it enters the normal DCF procedure so that more packets can be aggregated and transmitted upon each transmission opportunity, thereby improving channel utilization. The aggregation technology (that is, many packets are packaged into a superframe for one transmission) is a very promising technology and has been adopted by the latest IEEE 802.11ac specification [5], [9]. The DCA protocol, which attempts to address an issue of how and when to aggregate these packets, is therefore worthy of further study.

To the best of our knowledge, however, all existing publications (such as [10]) have investigated the performance of DCA only via simulation. If a theoretical analysis is made, it is possible to understand the impact of different system parameters on the DCA performance, thereby allowing a maximization of performance by adopting one or more optimized system parameters.

There is a need in the art for a method to determine optimized system parameters for DCA so as to maximize the system performance, particularly for a WLAN.

SUMMARY OF THE INVENTION

One aspect of the present invention is to provide a contention-based method for enabling one or more nodes to communicate with an AP over a multiple-access channel. The method is as follows. When an individual node enters into a state of having at least one packet of data to be transmitted to the AP, the individual node waits for a non-zero deterministic delay for allowing any packet arrived during the delay to be aggregated and transmitted upon one transmission opportunity. The delay is determined by (19) given below. After the delay expires, the individual node initiates a procedure of contending for access to the channel.

Another aspect of the invention is to provide a method for enabling one or more nodes to communicate with an AP over a multiple-access channel by contending among the one or more nodes for access to the channel according to a CSMA/CA protocol, where the CSMA/CA protocol comprises a contending procedure for an individual node to contend for access to the channel. In the method, when the individual node enters into a state of having at least one packet of data to be transmitted to the AP, the individual node waits for a non-zero deterministic delay so that any packet arrived during the delay is allowed to be aggregated and transmitted upon one transmission opportunity. After the delay expires, the individual node initiates the contending procedure. Before performing the waiting, the individual node determines the delay such that a predicted throughput of a wireless system is maximized where the wireless system consists of the AP and the one or more nodes. In particular, the delay is determined according to the number of the one or more nodes.

Preferably, the determining of the delay comprises determining an attempt rate such that the predicted throughput of the wireless system is maximized. Afterwards, the delay is determined according to at least the determined attempt rate and the number of the one or more nodes.

The methods as disclosed herein are advantageously useful for a WLAN system comprising an AP and one or more nodes.

Other aspects of the present invention are disclosed as illustrated by the embodiments hereinafter.

DETAILED DESCRIPTION

In a previously-proposed DCA protocol, the delay that a node enters into a normal DCF procedure is random. It makes theoretical analysis difficult so that an optimized system parameter that maximizes the system performance is not derivable. Based on this observation, we propose a special case of DCA where the random delay is replaced by a deterministic constant. We call a protocol that utilizes this special case as a delayed-DCF protocol.

In the delayed-DCF protocol, a node must wait for an extra deterministic delay before it enters into the normal DCF procedure and transmits at most one packet upon each transmission opportunity. If the deterministic delay is set to zero, the delayed-DCF becomes the legacy DCF. Note that there is a distinct difference between the deterministic delay and the backoff time in the legacy DCF procedure. The former is independent of the channel status, whereas in the latter, its timer may be suspended and resumed, depending on the channel status.

In the present work, a theoretical model is developed to characterize the impact of the non-zero deterministic delay on the collision probability, throughput, MAC delay mean, and MAC delay variance. With this model, the saturation performance of the delayed-DCF network is investigated, where each station always has a packet to transmit. From the analytical and simulation results obtained herein, it is found that the system performance is significantly affected by the relationship between the deterministic delay, d, in microseconds (μs) and the number of nodes, n. For example, the mean MAC access delay of each packet is almost equal to d μs when d>n, and is O(n) μs otherwise. With this model, an asymptotic analysis is performed to calculate the optimal deterministic delay that maximizes the system throughput. Finally, extensive simulations were run to verify that the developed model can well predict the impact of this determinist delay on the system performance, and the theoretical optimal deterministic delay can make the system achieve the maximum system throughput.

A. DCF and Delayed-DCF

A.1 IEEE 802.11 DCF Protocol

Figure 1A:
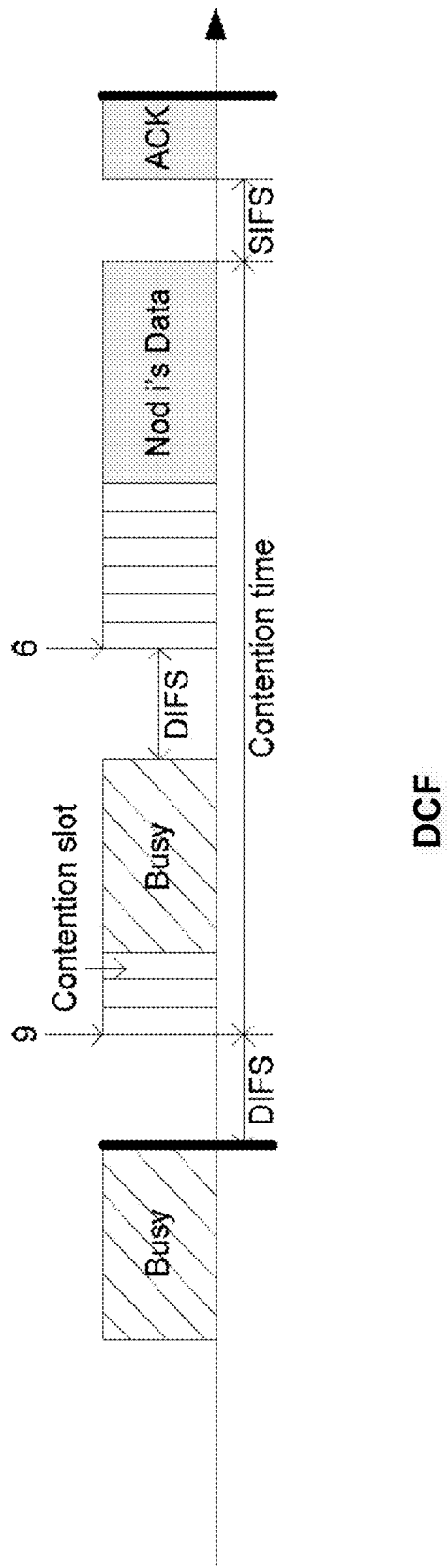
FIG. 1A is a timing diagram illustrating the DCF access mode.

The IEEE 802.11 DCF [1] is based on CSMA/CA. DCF has two channel access mechanisms: the mandatory basic access mechanism and the optional RTS/CTS access mechanism. In this work, only the basic access mode is considered. With the help of FIG. 1A, the main procedure used in the basic access mode is described as follows.

Before transmitting a packet, a node first senses a channel for at least a DIFS. During the DIFS time, if the channel is sensed idle, the node may begin the transmission process. On the other hand, if the channel is sensed busy, the node will defer access and enter into a contention period.

During the contention period, the node employs the BEB algorithm to resolve collisions. In the BEB algorithm, a node initially generates a random backoff time uniformly distributed over [0, $CW_{min}-1$], where $CW_{min}$ is a given minimum CW size. Thereafter, the backoff counter decreases by one for each idle time slot and is suspended for each busy slot. The suspended backoff counter resumes after the channel is sensed idle for a DIFS period. When the backoff counter reaches zero, the node starts transmitting the HOL packet at the beginning of the next time slot. For example, in FIG. 1A, node i first chooses a backoff time equal to 9 and starts counting down. When the backoff counter reduces to 6, node i suspends the counter because the channel is sensed busy and resumes the counter later after the channel has been sensed idle for a DIFS period.

For each successful transmission, the sender receives an ACK frame after a time of SIFS. If the node does not receive the ACK within a certain time (i.e. ACK timeout), it is assumed that the data packet was not successfully received at the destination node; then the node doubles the CW and repeats the above procedure. Doubling of the CW stops after the maximum window size $CW_{max}$ is reached. When a retransmission limit is reached, the sender discards the data packet. Note that according to the IEEE 802.11 DCF protocol, two consecutive data packet transmissions of a node are separated by at least a randomly-selected time uniformly distributed over [0, $CW_{min}-1$].

A.2 Delayed-DCF

Figure 1B:
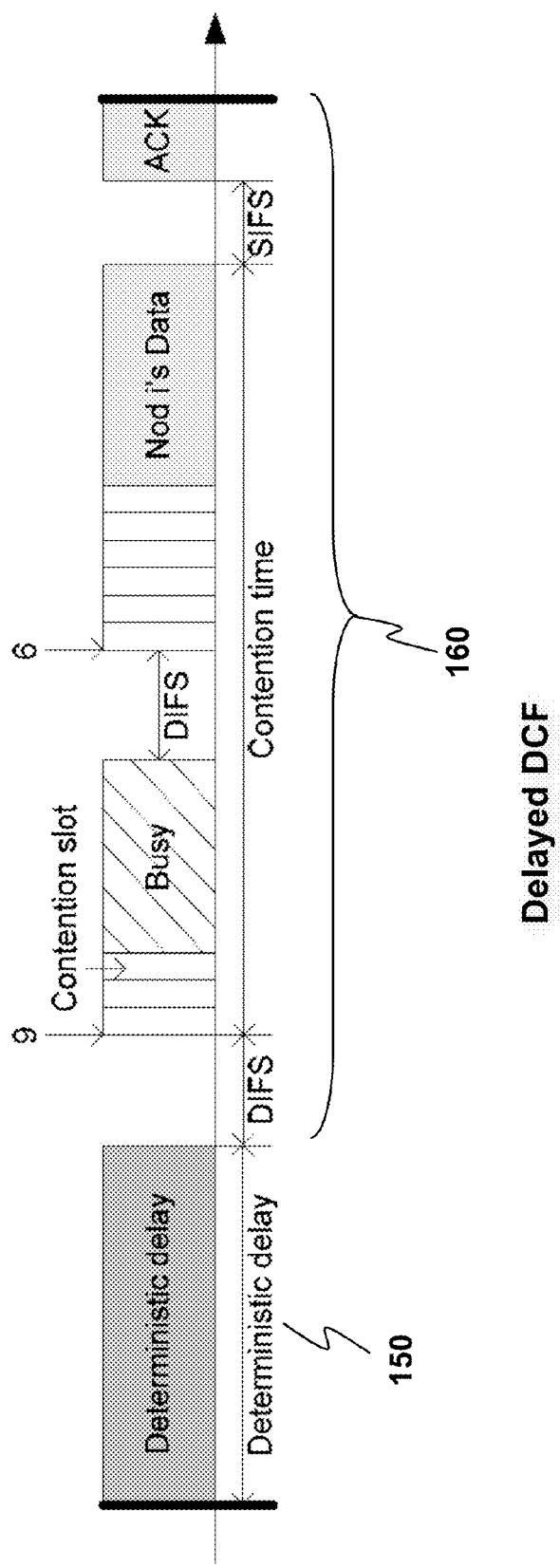
FIG. 1B is a timing diagram illustrating the delayed-DCF access mode.

FIG. 1B illustrates the delayed-DCF. Similar to DCF, a node under delayed-DCF transmits at most one packet upon each transmission opportunity. However, unlike DCF, a node under delayed-DCF always waits for a deterministic delay 150 (denoted by d herein) before entering into a subsequent DCF procedure 160. A special case is that when the deterministic delay, d, is equal to 0, the delayed-DCF protocol becomes the legacy DCF protocol.

The delayed-DCF protocol actually adopts a mixed-type contention resolution method. One is the deterministic delay 150, which is independent of the channel status, and its counter is never suspended and will keep counting down once the counter is installed. The deterministic delay 150 postpones the time that nodes contend for channel. Another is the backoff time, which is greatly affected by the channel status and therefore its counter will be suspended for a busy slot and resumed for subsequent idle slots. The backoff time increases as the contention becomes more intensive. The two types of delays objectively alleviate contention intensity.

This work is concerned with the impact of the deterministic delay d 150 on the performance of the subsequent DCF procedure 160. This performance has never been investigated before.

B. Performance Analysis

In this section, a theoretical model is developed to evaluate the performance of the delayed-DCF protocol. The collision probability that governs all other performance metrics is first analyzed, and the throughput and the mean and variance of the MAC access delay is then computed.

The terminologies and the assumptions that are used in the analysis are introduced as follows. A packet transmission is said to be finished when the packet is either successfully received at the destination node or is dropped due to reaching a retransmission limit. The time is measured in MAC time slots unless otherwise indicated. Similar to [6], it is assumed that: 1) all nodes are in saturation operation and reside in a single-cell network (that is, all stations are in the sensing range of each other); 2) the collision processes of the nodes can be decoupled; and 3) channel conditions are ideal so that transmission errors are a result of packet collision only.

B.1 Analysis of the Collision Probability

This section characterizes the collision probability and the attempt rate, which are governed by a fixed-point system described below.

Let $\gamma$ denote the collision probability experienced by a tagged node on the condition that the buffer is not empty. Let $\beta$ denote the attempt rate of each node (i.e. the ratio of the number of attempts in a generic slot) under a condition that the buffer is not empty, where the generic slot represents the time elapsed for one decrement of the backoff counter. According to the decoupling assumption 2), the tagged node experiences a collision if at least one of the remaining n−1 nodes transmits, where n (n≥2) is the number of contending nodes. Therefore, $\gamma$ can be expressed in terms of $\beta$ as $$\gamma = 1-(1-\beta)^{n-1}. \quad (1)$$

Then we express $\beta$ in terms of $\gamma$, following the approach used in [6]. According to the BEB algorithm, a packet can undergo a maximum of M attempts, where each attempt is preceded by a backoff stage with a randomly selected backoff count $\eta_k$ at stage k. The stage k is the backoff stage immediately before the (k+1)th attempt of packet transmission. Note that 0≤k≤M−1. The probability of making j+1 attempts, where j=0, K, M−1, is given by $$\delta(\gamma, j) = \begin{cases} (1-\gamma)\gamma^j, & j = 0, K, M \\ \gamma^{M-1}, & j = M-1 \end{cases} \quad (2)$$

where the upper term on the right side of (2) is the probability that the packet suffers j collisions before success, and the lower term thereof is the probability of either M−1 collisions before success or M collisions.

Let R and X be the number of attempts and the time (in generic slots) excluding DIFS, respectively, incurred by a packet transmission of the tagged node between when the node starts decreasing its deterministic delay and when its targeted packet transmission is finished. Then X includes two components: one is the number of the generic slots (denoted by $\xi$) elapsed during the deterministic delay d, and another one is the number of the generic slots elapsed after the deterministic delay and before the targeted packet transmission of the tagged node is finished. From (2), we have that $$R=j+1, w.p.\delta(\gamma,j), 0 \leq j \leq M-1, \quad (3)$$

$$X-\xi = \sum_{k=0}^{j} \eta_k, w.p.\delta(\gamma,j), 0 \leq j \leq M-1,$$

where 'w.p.' means 'with probability'. In (3), $\eta_k$ is uniformly distributed in [0, $CW_k-1$] with mean $\bar{\eta}_k \triangleq b_k = (CW_k-1)/2$, where $CW_k = 2^k CW_0$ for 0≤k≤m−1 and $CW_k = 2^m CW_0$ for m≤k≤M−1; m determines the maximum backoff window size $CW_{max}$ (i.e. $CW_{max} = 2^m CW_0$) and $CW_0$ is the minimum window size. Note that $b_k$ is the mean value of randomly selected backoff count at the k th backoff stage, 0≤k≤M−1. Let $\bar{R}$, $\bar{X}$ and $\bar{\xi}$ denote the means of R, X and $\xi$, respectively. We have that $$\bar{R} = \sum_{j=0}^{M-1} (j+1)\delta(\gamma, j) = 1 + \gamma + L + \gamma^{M-1}, \quad (4)$$

$$\bar{X} = \bar{\xi} + \sum_{j=0}^{M-1} \sum_{k=0}^{j} b_k \delta(\gamma, j)$$

$$= \bar{\xi} + b_0 \delta(\gamma, 0) + \sum_{k=0}^{1} b_k \delta(\gamma, 1) + L$$

$$= \bar{\xi} + b_0 + \gamma b_1 + \gamma^2 b_2 + L + \gamma^{M-1} b_{M-1}.$$

We now calculate $\bar{\xi}$. Let $\Omega$ be the length of a generic slot and $\bar{\Omega}$ be the mean of $\Omega$. According to the definition of $\xi$, we have $$\bar{\xi} = \frac{d}{\bar{\Omega}} \quad (5)$$

and hence we only need to calculate $\bar{\Omega}$. The generic slot duration $\Omega$ depends on whether a slot is idle or interrupted by a successful transmission or a collision. We then define $\Omega$ as $$\Omega = \begin{cases} \sigma & w \cdot p \cdot 1 - P_b \\ T_s + \sigma & w \cdot p \cdot P_S \\ T_{\bar{S}} + \sigma & w \cdot p \cdot P_{\bar{S}} \end{cases} \quad (6)$$

where:

$$P_b = 1 - (1-\beta)^n = 1 - (1-\gamma)^{\frac{n}{n-1}}, \quad (7)$$

$$P_s = n\beta(1-\beta)^{n-1} = n\left(1-(1-\gamma)^{\frac{1}{n-1}}\right)(1-\gamma),$$

$$P_{\bar{s}} = P_b - P_s,$$

denote the probability of a busy slot, the probability of a successful transmission from any of the n contending nodes, and the probability of an unsuccessful transmission from any of the n contending nodes, respectively; $\sigma$ is a duration of one time slot; and $T_s$ and $T_{\bar{s}}$ are the mean time for a successful transmission and an unsuccessful transmission, respectively. The parameters $T_s$ and $T_{\bar{s}}$, depend on packet payload length, SIFS, DIFS, and other protocol parameters. An example value of $\sigma$ is given by 20 μs according to the IEEE 802.11 specification. Note that since the backoff counter must be decreased by one slot before the next decrease, to be strictly correct, we add one slot in each of the last two terms of $\Omega$. From (6), we can calculate $\bar{\Omega}$ by $$\bar{\Omega} = \sigma + P_s T_s + P_{\bar{s}} T_{\bar{s}}. \quad (8)$$

Now applying the renewal reward theory, we have $$\beta = \frac{\bar{R}}{\bar{X}}.$$

From (4) and (5), $\beta$ is given by $$\beta = \frac{1 + \gamma + L + \gamma^{M-1}}{\frac{d}{\bar{\Omega}} + b_0 + \gamma b_1 + \gamma^2 b_2 + L + \gamma^{M-1} b_{M-1}}. \quad (9)$$

Note that when d=0 in (9), $\beta$ reduces to (1) in [6].

So far, we have expressed $\beta$ in terms of $\gamma$ in (9). Substituting $\beta$ in (9) into (1), and solving the fixed-point equation with respect to $\gamma$, we can calculate the collision probability $\gamma$ and then the attempt rate $\beta$.

B.2 Computation of Throughput and Delay

This section presents formulae for the throughput, and the mean and variance of the MAC access delay.

Throughput: For the per-node throughput, $\Gamma$, we adopt the expression derived in [6] and [2], namely $$\Gamma = \frac{P_s}{n} \frac{L}{\bar{\Omega}}, \quad (10)$$

where L is the packet size in bits, $$\frac{P_s}{n}$$

is the per-node probability of a successful packet transmission.

Mean and variance of the MAC access delay: We define the MAC access delay as the interval between when a packet enters the head-of-the-line of its queue and when the packet is successfully received at the destination node. Let D denote the MAC access delay and it consists of (i) the deterministic delay d, and (ii) the random time interval $D_1$ between a time instant that the deterministic delay ends and another time instant that the packet is successfully received at the destination node.

Let $\bar{D}$ and $\bar{D}_1$ denote the mean of D and $D_1$, respectively. We have $$\bar{D} = d + \bar{D}_1. \quad (11)$$

In the last expression $\bar{D}_1$ can be calculated by (18) in [8] and is given as follows:

$$\bar{D}_1 = A_1 + B_1 \text{ in which } A_1 = \frac{1-\gamma}{1-\gamma^M} \sum_{i=0}^{M-1} \gamma^i \left\{ \theta_1 \sum_{k=0}^{i} \bar{\eta}_k + iT_{\bar{s}} \right\};$$

and $B_1 = T_s - T_{ACK}$ in which $T_{ACK}$ is the transmission time of an ACK packet;

where $\theta_1$ is defined in (13).

Let Var(D) denote the variance of D. We have that $$\text{Var}(D) = \text{Var}(D_1). \quad (12)$$

In the last expression, Var($D_1$) can be calculated by (19) in [8] and is given as follows:

$$\text{Var}(D_1) = \frac{1-\gamma}{(1-\gamma^M)} \sum_{i=0}^{M-1} \gamma^i \{A_2^i + B_2^i\},$$

where $A_2^i = \sum_{k=0}^{i} (\bar{\eta}_k \theta_3 + (\theta_1)^2 \text{Var}(\eta_k))$, $$B_2^i = \left(\theta_1 \sum_{k=0}^{i} \bar{\eta}_k + iT_{\bar{s}} - A_1\right)^2,$$

where $\theta_1$ and $\theta_3$ are defined in (13):

$$q = (n-1)\beta(1-\beta)^{n-2}, \quad (13)$$

$$\theta_1 = \sigma + \theta_2,$$

$$\theta_2 = (qT_s + (\gamma-q)T_{\bar{s}})(1-\beta),$$

$$\theta_3 = (q(T_s - \theta_2)^2 + (\gamma-q)(T_{\bar{s}} - \theta_2)^2)(1-\beta) + (1-\gamma(1-\beta))(\theta_2)^2.$$

C. Optimal Deterministic Delay

In this section, we seek the optimal deterministic delay so as to maximize the system throughput. Below, we first derive the optimal attempt rate, and then calculate the optimal deterministic delay.

C.1 Optimal Attempt Rate

This section derives the optimal attempt rate, $\beta_{opt}$, that maximizes the system throughput.

From (10) and (8), the system throughput $n\Gamma$ is given by $$n\Gamma = \frac{P_s L}{(1-P_b)\sigma + P_s T_s + P_{\bar{s}} T_{\bar{s}}} \quad (14)$$

$$= \frac{L}{T_s + \frac{(1-P_b)\sigma + P_{\bar{s}} T_{\bar{s}}}{P_s}}.$$

Then, from (14), to maximize $n\Gamma$, we just need to maximize $h(\beta)$:

$$h(\beta) \triangleq \frac{(1-P_b)\sigma + P_s T_s}{P_s}. \tag{15}$$

Setting the first-order derivative of (15) in terms of β to 0, we obtain the equation $$1 - n\beta = \eta(1-\beta)^n \tag{16}$$

where $\eta = 1 - \frac{\sigma}{T_s}$.

Let $\phi \triangleq \lim_{n \to \infty} n\beta$ be the asymptotic aggregate attempt rate. Assume that φ exists, and apply the Poisson approximation to (16). We have $$1 - \phi = \eta e^{-\phi}$$

$$1 - \phi = \frac{\eta}{e} e^{-\phi+1}$$

$$(\phi - 1)e^{\phi - 1} = -\frac{\eta}{e}.$$

Note that e≈2.718281828 is Euler's number. Let $W_0(\bullet)$ be one branch of the Lambert W(z) function [4], $W(z)e^{W(z)}=z$ for any complex number z. Then $$\phi - 1 = W_0\left(-\frac{\eta}{e}\right) \text{ or } W_{-1}\left(-\frac{\eta}{e}\right).$$

Note that $$W_0\left(-\frac{\eta}{e}\right) > -1 \text{ and } W_{-1}\left(-\frac{\eta}{e}\right) < -1 \text{ for } -\frac{\eta}{e} \in \left(\frac{-1}{e}, 0\right).$$

Then the optimal φ, $\phi_{opt}$, is given by $$\phi_{opt} = W_0\left(-\frac{\eta}{e}\right) + 1.$$

Because $\phi_{opt} \approx n\beta_{opt}$ for a given n, the optimal attempt rate, $\beta_{opt}$, is given by $$\beta_{opt} \approx \frac{1}{n}\left[W_0\left(-\frac{\eta}{e}\right) + 1\right]. \tag{17}$$

Remarks: Under the assumption that each node just transmits one packet upon one transmission opportunity, Eq. (17) is derived. When the packet aggregation technology is adopted to aggregate a plurality of packets into a superframe, Eq. (17) holds true as well and what we need is to recalculate η (or the $T_{\bar{s}}$). For example, assume that each node can fill K packets with length L bytes into the payload field of the 802.11 MAC frame, and transmit the superframe upon one transmission opportunity. Then, all deductions from (14) to (17) keep unchanged, except that in (14), we replace L by KL, and calculate $T_s$ by KL, and set (i) $T_{\bar{s}}=T_s$ if the basic access mechanism is adopted or (ii) set $T_{\bar{s}}=$ Trts +Tsifs+Tcts if the RTS/CTS access mechanism is adopted, where Trts, Tsifs and Tcts, respectively, are the RTS transmission time, the SIFS time, and the CTS transmission time.

C.2 Optimal Deterministic Delay

According to the delayed-DCF, a node always first waits for a deterministic delay and then enters into the subsequent DCF procedure. Therefore, the deterministic delay is closely connected to the attempt rate. In this section, we calculate the optimal deterministic delay, $d_{opt}$, that achieves the optimal attempt rate $\beta_{opt}$.

From (17) and (1), the optimal attempt rate $\beta_{opt}$ and the optimal collision probability $\gamma_{opt}$ are given by (18):

$$\begin{cases} \beta_{opt} = \frac{1}{n}\left[W_0\left(-\frac{\eta}{e}\right) + 1\right] \\ \gamma_{opt} = 1 - (1-\beta_{opt})^{n-1} \end{cases}. \tag{18}$$

Note that $\beta_{opt}$, $\gamma_{opt}$, and $d_{opt}$ are constrained by (9). It follows that $d_{opt}$ is expressed as follows:

$$d_{opt} = \overline{\Omega}(\beta_{opt})\left[\frac{1 + \gamma_{opt} + L + \gamma_{opt}^{M-1}}{\beta_{opt}} - (b_0 + \gamma_{opt}b_1 + \gamma_{opt}^2 b_2 + L + \gamma_{opt}^{M-1}b_{M-1})\right], \tag{19}$$

where $\overline{\Omega}(\bullet)$ is given by (8).

D. Model Verification

In the previous two sections, we theoretically analyze the performance of the delayed-DCF protocol, and the optimal deterministic delay that maximizes the system throughput. In this section, we verify these theoretical results using the 802.11 simulator in ns2 version 2.28 (http://www.isi.edu/nsnam/ns/ns-build.html) with some modifications. The purpose of these modifications is to add a deterministic delay d into the traditional DCF so as to be consistent with the delayed-DCF protocol. In our simulation, we used the DumbAgent routing protocol and set the simulation time to 100 seconds. The default parameter values shown in Table 1 were set in accordance with the IEEE 802.11b standard.

TABLE 1

Default parameter settings used in this work.

| | | | |
|---|---|---|---|
| $CW_0$ | 32 | Header | 241 ms = Mheader + Pheader + RouteHeader |
| m/M | 5/7 | $T_s$ | 940 ms = Header + $L_{pn}$ + SIFS + δ + ACK + δ + DIFS |
| σ | 20 ms | $T_{\bar{s}}$ | = $T_s$ |
| δ | 0 ms | $L_{pn}$ | 335 ms = 460 bytes @ $R_{data}$ |
| SIFS | 10 ms | ACK | 304 ms = 24 bytes @ $R_{basic}$ + 14 bytes @ $R_{basic}$ |
| DIFS | 50 ms | Mheader | 20 ms = 24 bytes @ $R_{data}$ + 4 bytes @ $R_{data}$ |
| $R_{data}$ | 11 Mbps | Pheader | 192 ms = 24 bytes @ $R_{basic}$ |
| $R_{basic}$ | 1 Mbps | RouteHeader | 29 ms = 40 bytes @ $R_{data}$ |

We consider a one-hop star network with an AP and n saturated nodes, where the AP only acts as the receiver of data packets from all nodes. We present the theoretical results under the assumption of $T_s=T_{\bar{s}}$. For practical networks, this assumption does not necessarily hold. However, many analytical studies, including [7], [2] and [6], adopt this assumption, and it has also been adopted by the developers of the ns2 simulation tool (http://www.isi.edu/nsnam/ns/ns-build.html). The assumption is equivalent to assuming that ACK packets are transmitted at the basic rate and the ACK timeout after a collision matches the guard time observed by non-colliding nodes.

D.1 Performance Evaluation

In this subsection, we study the impact of d on the throughput, the collision probability, the mean and standard deviation of the MAC access delay when the number of nodes n varies from 4 to 30, where d=5, 10 μs. It has been proved in [8] that for a one-hop WLAN with n contending nodes and d=0 μs, the mean MAC delay of a packet is O(n) μs. We will show that the system performance of the delayed-DCF protocol varies significantly, relying on the relationship between d and n. The main reason is that the dominant component of the MAC access delay is the deterministic delay of d μs when d>n, and is the random delay in DCF of O(n) μs otherwise.

Figure 2:
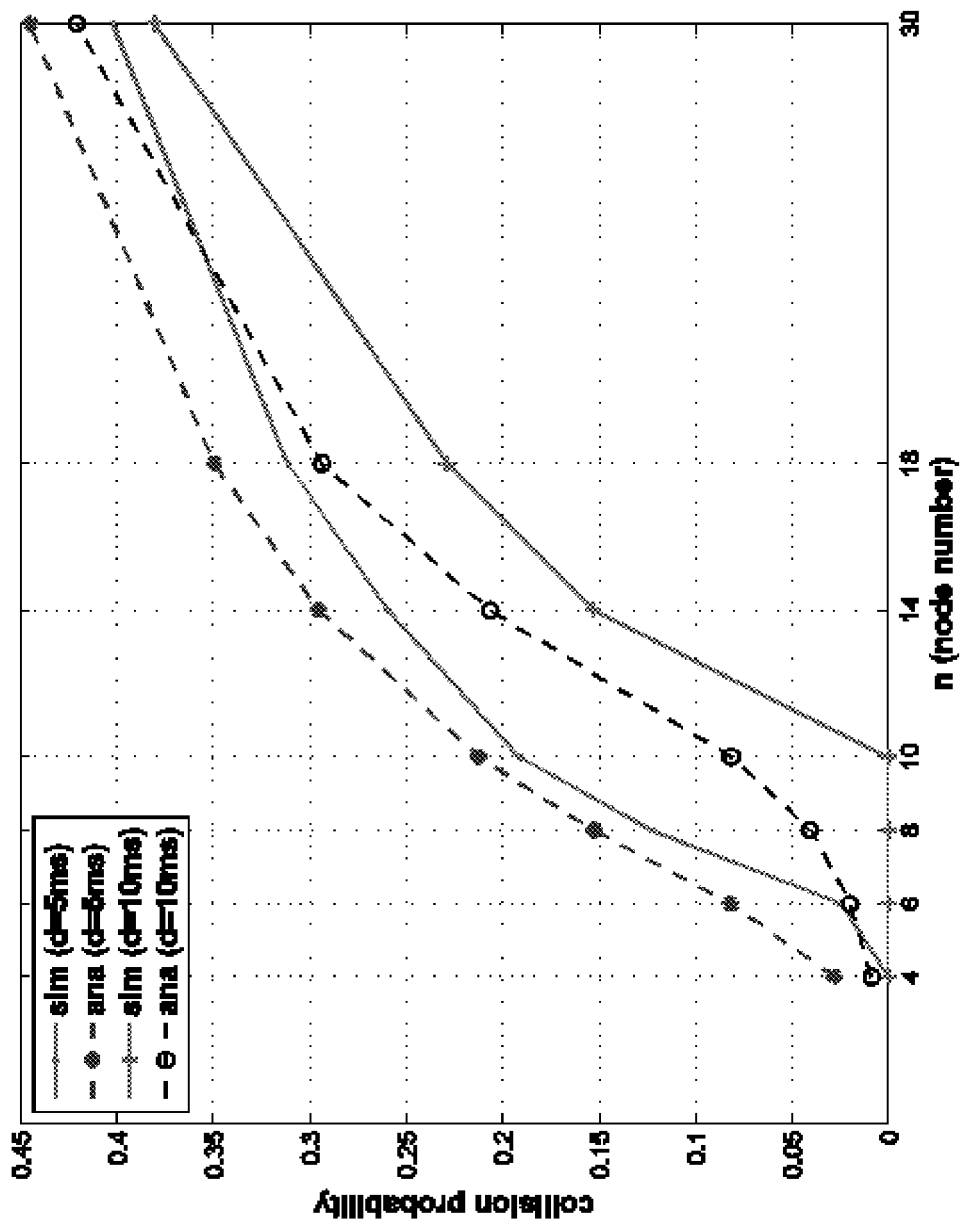
FIG. 2 shows the collision probability versus the number of nodes for assessing the impact of the selected delay in a delayed-DCF network.

FIG. 2 plots the collision probability versus the number of nodes, where the theoretical results are calculated by (8) and (1). From FIG. 2, we can see that the collision probability increases as n increases when d=5, 10 μs. However, for each n, the collision probability when d=5 μs is obviously larger than that when d=10 μs. The reason is that the larger d greatly alleviates the contention intensity, leading to a lower collision probability. Particularly, when n increases from 4 to 10, the simulated collision probability when d=5 μs increases from 0.02 to 0.22, whereas it is zero when d=10 μs.

Figure 3:
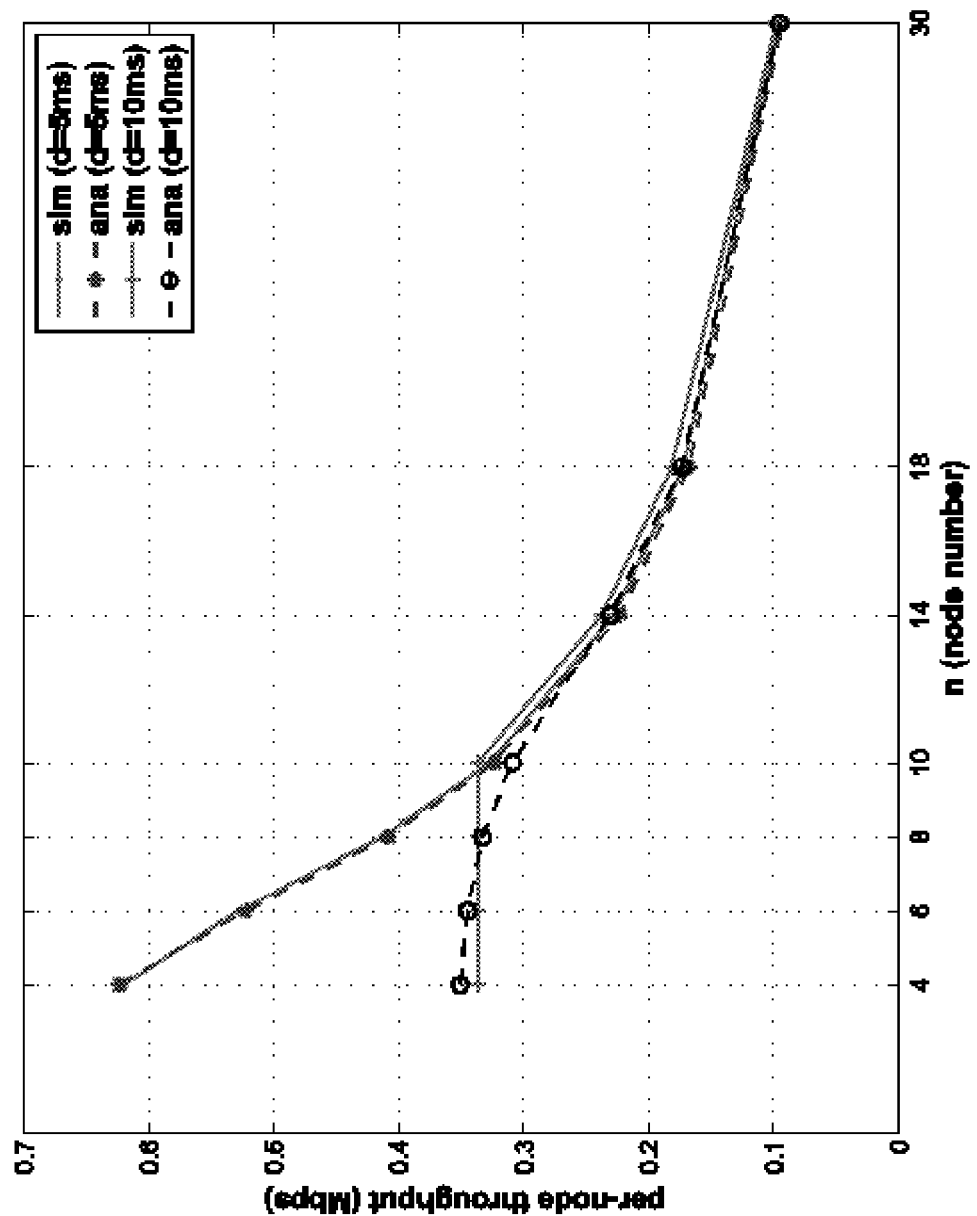
FIG. 3 shows the per-node throughput versus the number of nodes for assessing the impact of the selected delay in a delayed-DCF network.

FIG. 3 plots the per-node throughput versus the number of nodes, where the theoretical results are calculated by (9). From FIG. 3, as n increases from 10 to 30, we can see that the per-node throughput decreases and is almost equal for each n when d=5, 10 μs. However, for each n<10, the per-node throughput when d=10 μs keeps unchanged and is obviously less than that when d=5 μs. The reason is that when d>n, the MAC access delay and hence the per-node throughput is governed by d, and the larger d often makes the system idle, thereby lowering the channel utilization.

Figure 4:
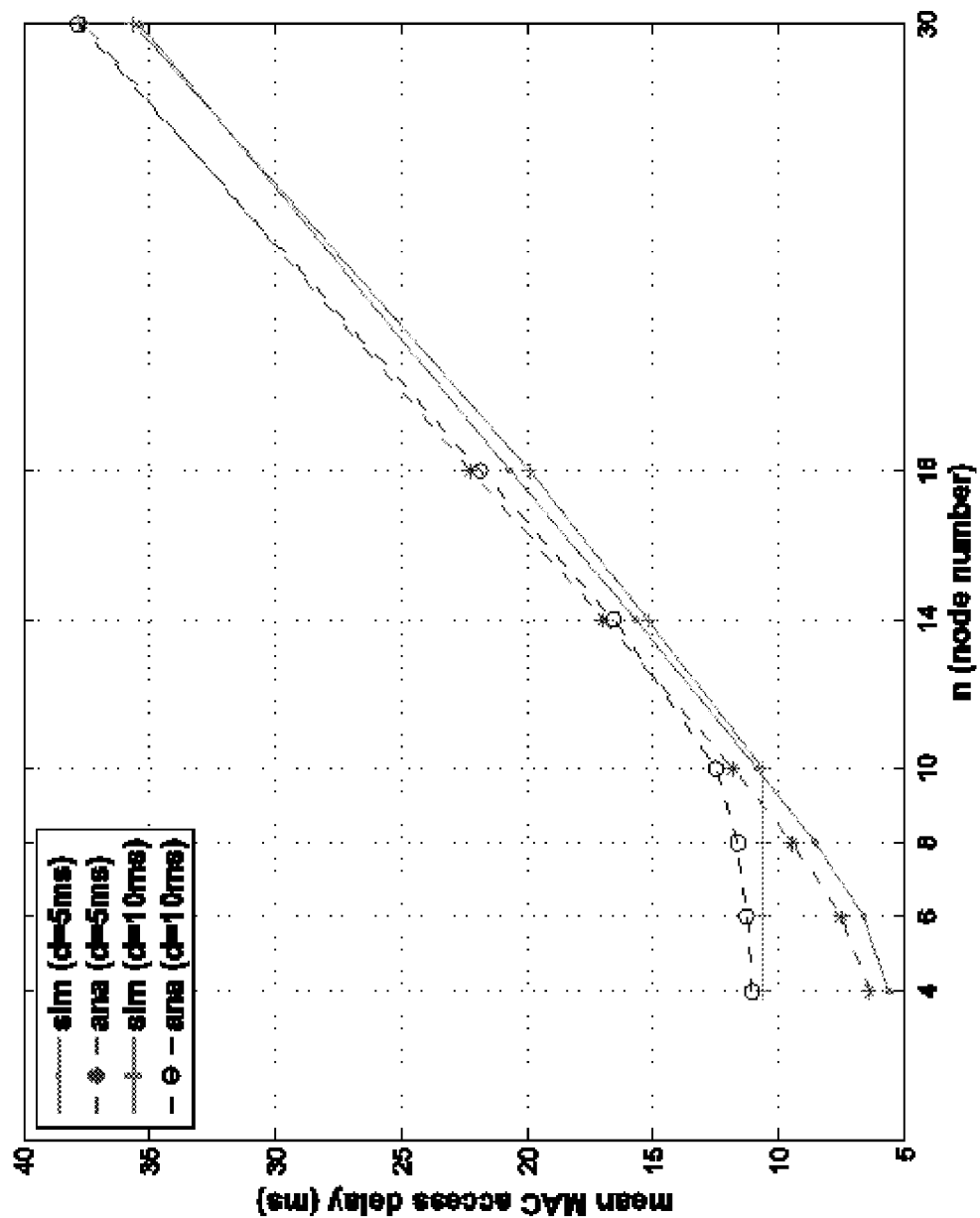
FIG. 4 shows the mean MAC access delay versus the number of nodes for assessing the impact of the selected delay in a delayed-DCF network.

FIG. 4 plots the mean MAC access delay versus the number of nodes, where the theoretical results are calculated by (10). From FIG. 4, the MAC access delay when d=10 μs is almost equal to 10 μs and is obviously less than that when d=5 μs for n<10, however, it is almost equal and is O(n) μs for each n>10 when d=5, 10 μs. This manifests that the dominant component of the MAC access delay is the deterministic delay d μs when d>n, and is the random delay in DCF of O(n) μs otherwise.

Figure 5:
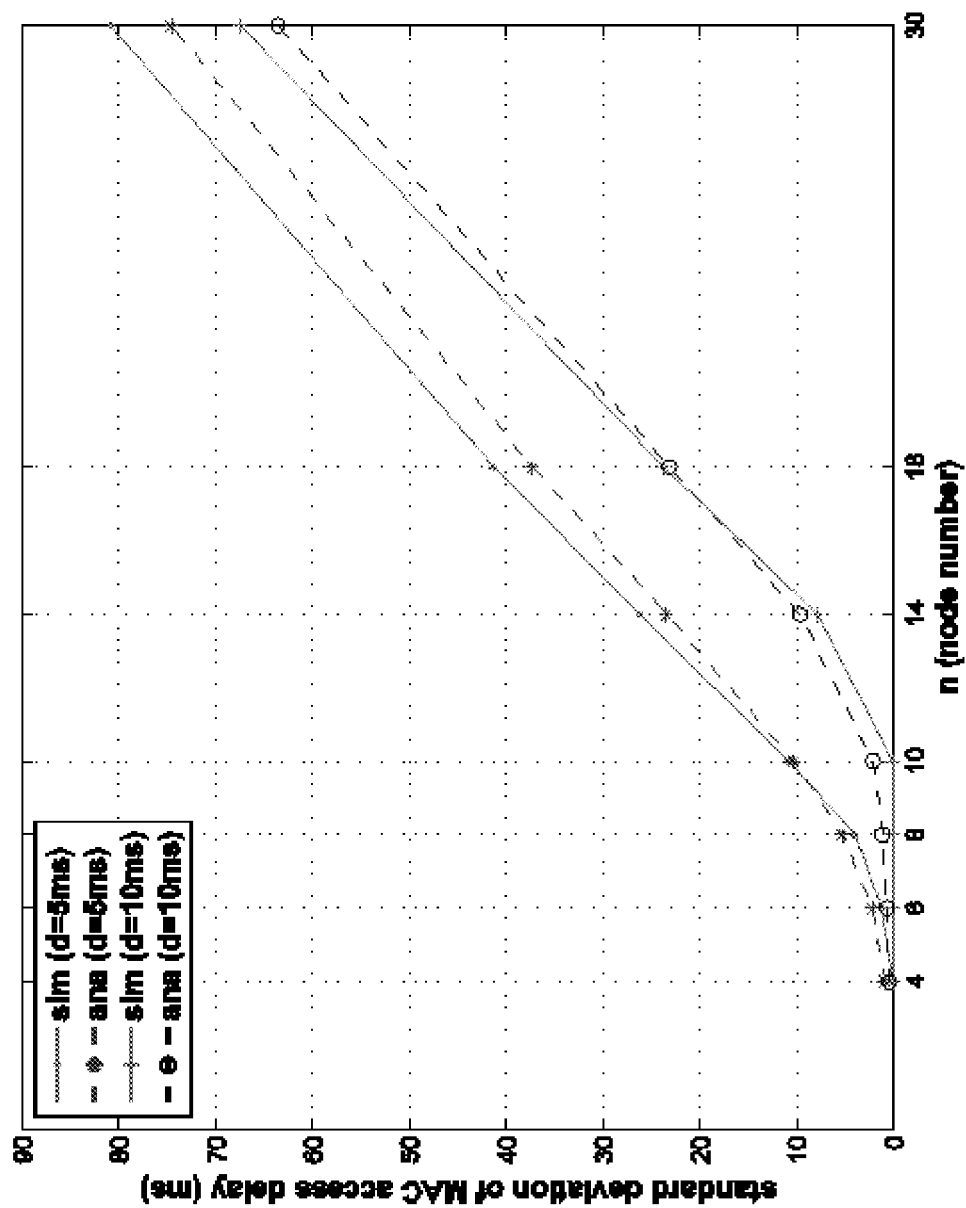
FIG. 5 shows the standard deviation of the MAC access delay versus the number of nodes for assessing the impact of the selected delay in a delayed-DCF network.

FIG. 5 plots the standard deviation of the MAC access delay versus the number of nodes, where the theoretical results are calculated by (11). From FIG. 5, we can see that the standard deviation increases as n increases when d=5, 10 μs. However, the standard deviation when d=5 μs is obviously larger that when d=10 μs for each n. Particularly, the standard deviation when d=10 μs for n<10 is almost zero since the MAC access delay is almost a constant and is equal to 10 μs under this case.

Finally, from FIGS. 2-5, we can see that all theoretical results, except the theoretical collision probability which slightly deviates from the simulated value, well match the corresponding simulated results, indicating that our model is very accurate.

D.2 Optimal Deterministic Delay

In this subsection, we verify the accuracy of the theoretical optimal deterministic delay, and illustrate that the optimal deterministic delay can significantly improve the system performance. To this end, we compare the throughput, the collision probability, the mean and standard deviation of the MAC access delay when the fixed deterministic delay d=5 μs and the optimal deterministic delay $d=d_{opt}$ are used, where d is measured in μs and is calculated by (18).

Figure 6:
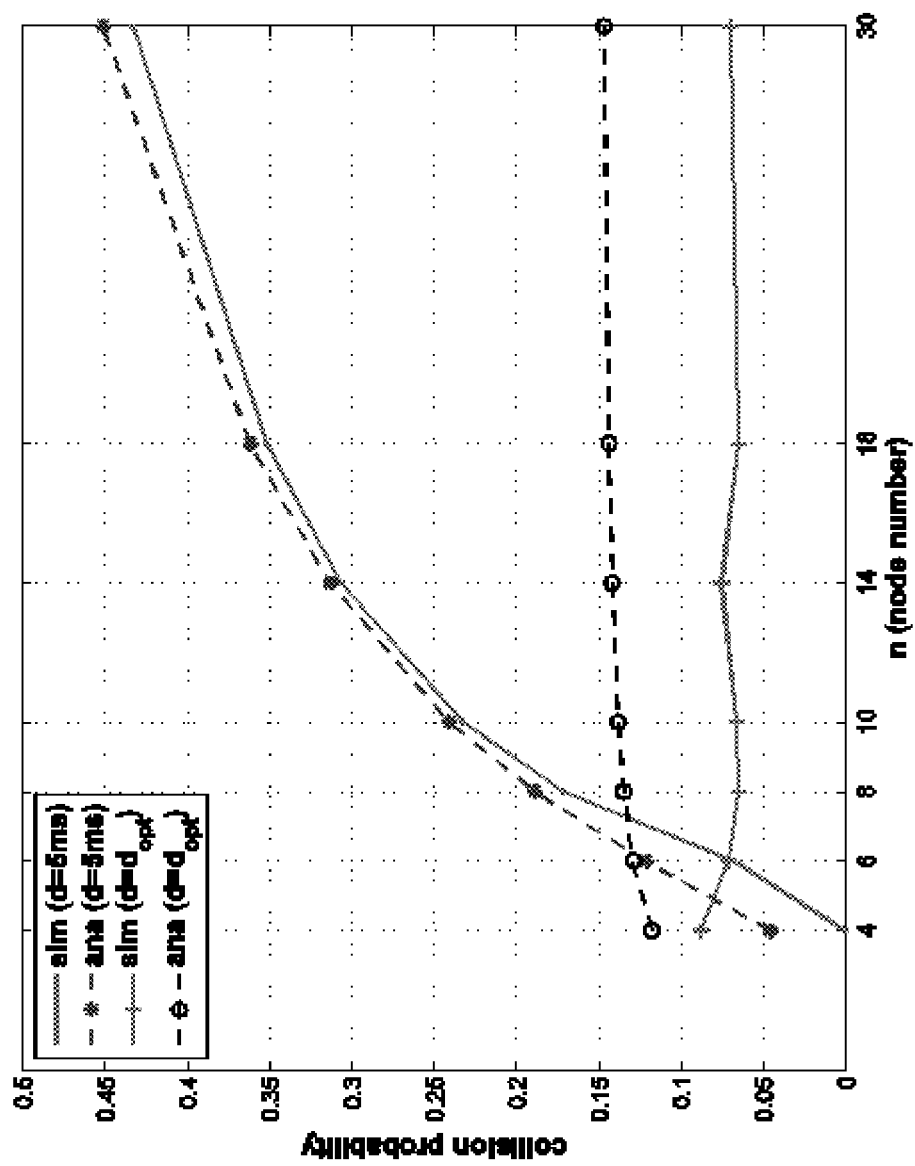
FIG. 6 shows the collision probability versus the number of nodes for a delayed-DCF network using the optimal deterministic delay as disclosed herein.

FIG. 6 plots the collision probability versus the number of nodes, where the theoretical results are calculated by (8) and (1). From FIG. 6, when d=5 μs, we can see that the collision probability significantly increases from 0 to 0.45 as n increases from 4 to 30. In contrast, when $d=d_{opt}$, we can see that the collision probability is always below 0.1, regardless of how n varies.

Figure 7:
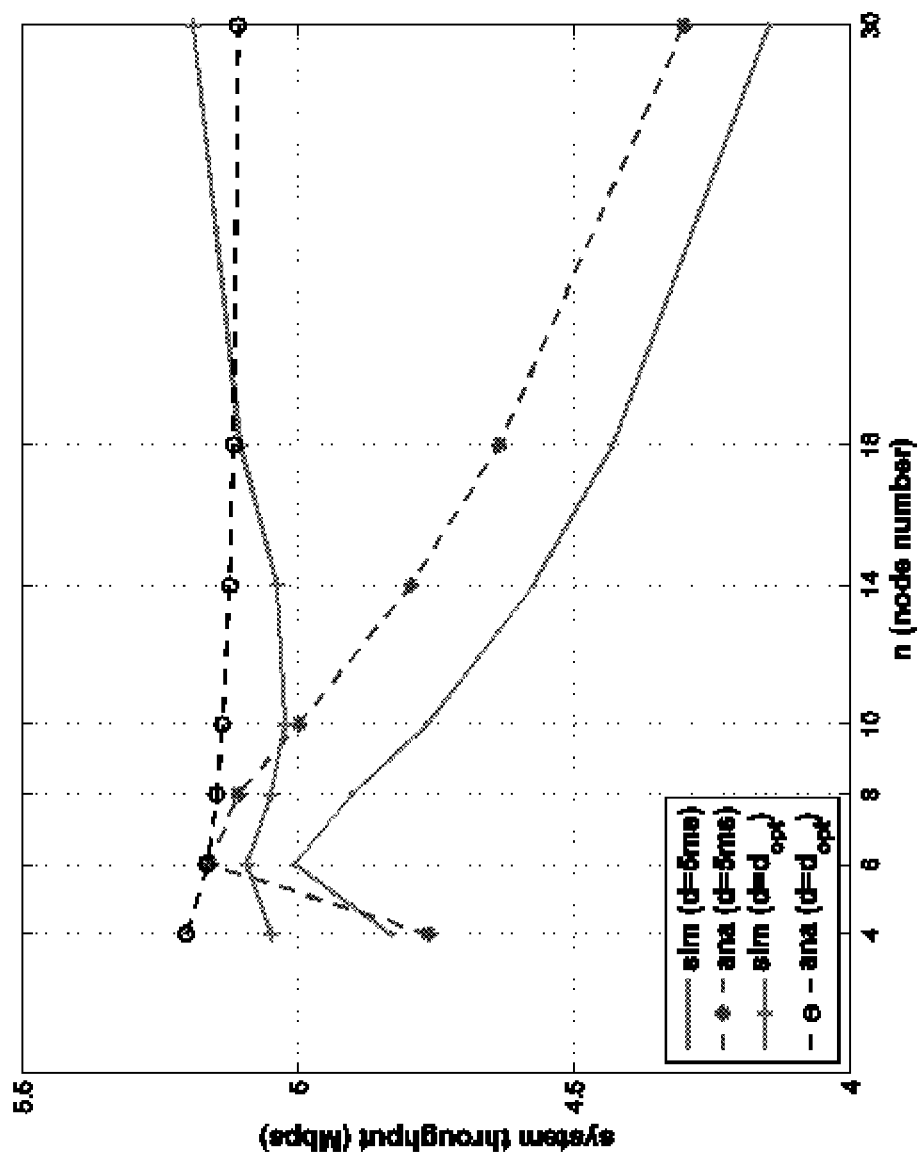
FIG. 7 shows the system throughput versus the number of nodes for a delayed-DCF network using the optimal deterministic delay as disclosed herein.

FIG. 7 plots the system throughput nΓ versus the number of nodes, where the theoretical results are calculated by (9). From FIG. 7, when d=5 μs, we can see that the system throughput first decreases from 4.8 Mbps to 5 Mbps as n increases from 4 to 6, and then decreases from 5 Mbps to 4.2 Mbps as n continues increasing from 6 to 30. The reason that the system throughput has a maximum value when n=6 is: the d=5 μs approximates the optimal deterministic delay. In contrast, when $d=d_{opt}$, we can see that the system throughput slightly fluctuates around 5.1 Mbps, which is always larger than that when d=5 μs.

Figure 8:
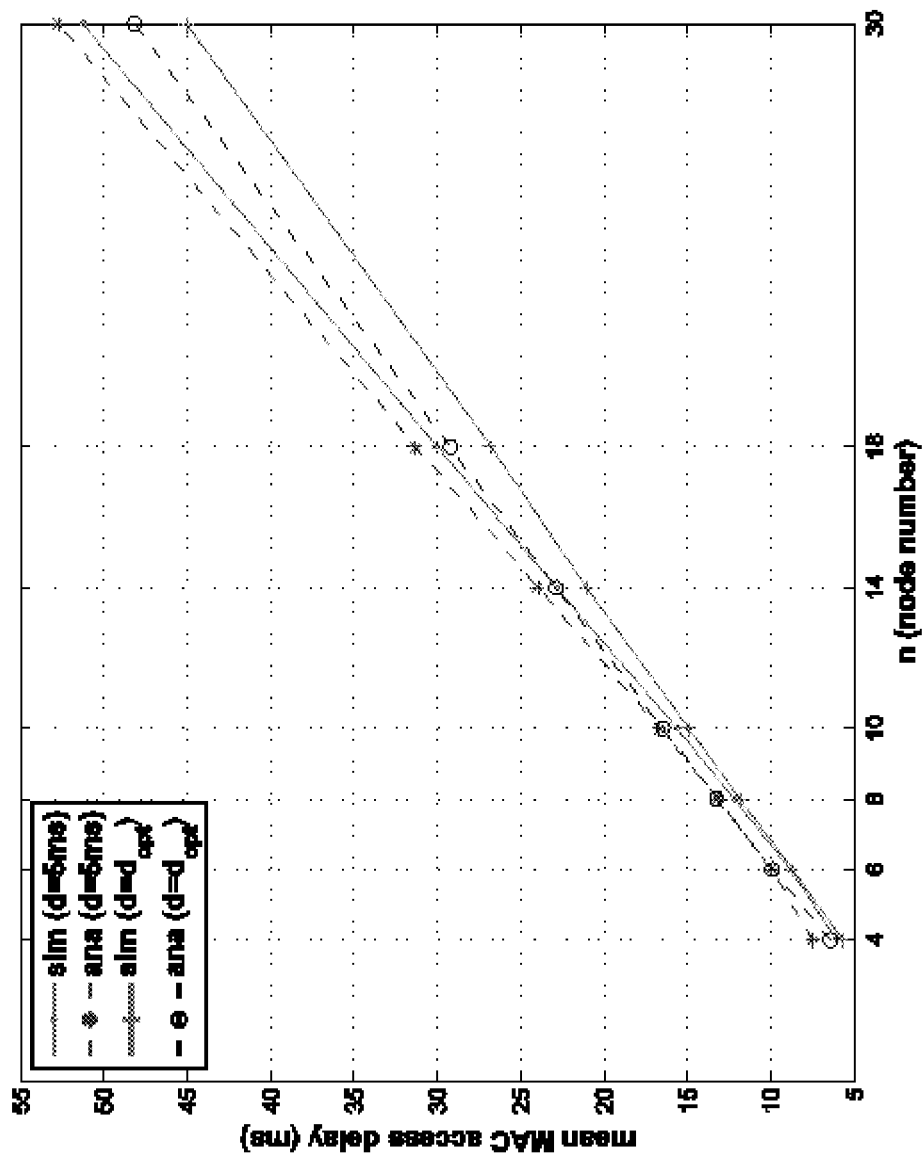
FIG. 8 shows the mean MAC access delay versus the number of nodes for a delayed-DCF network using the optimal deterministic delay as disclosed herein.

FIG. 8 plots the mean MAC access delay versus the number of nodes, where the theoretical results are calculated by (10). From FIG. 8, the MAC access delay when $d=d_{opt}$ is always not larger than that when d=5 μs.

Figure 9:
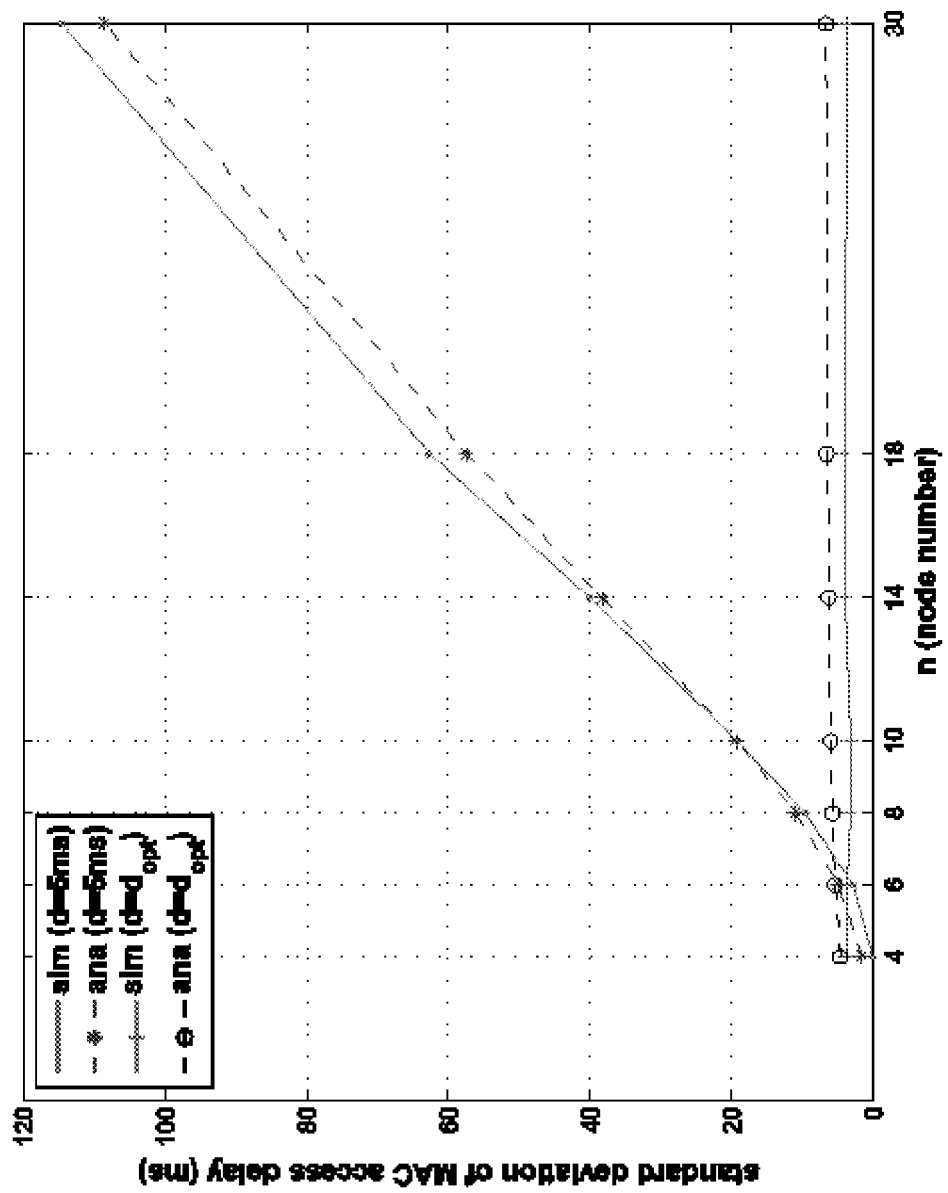
FIG. 9 shows the standard deviation of the MAC access delay versus the number of nodes for a delayed-DCF network using the optimal deterministic delay as disclosed herein.

FIG. 9 plots the standard deviation of the MAC access delay versus the number of nodes, where the theoretical results are calculated by (11). From FIG. 9, when d=5 μs, we can see that the standard deviation significantly increases from 0 to 115 μs as n increases from 4 to 30. In contrast, when $d=d_{opt}$, we can see that the standard deviation is always below 5 μs, regardless of how n varies.

Finally, from FIGS. 6-9, we can see that all theoretical results well match the corresponding simulated results, indicating that the theoretical optimal deterministic delay is accurate.

E. The Present Invention

As used herein in the specification and the appended claims, a CSMA/CA protocol for enabling one or more nodes to communicate with an AP over a multiple-access channel is a MAC protocol that realizes a contention-based multiple-access method in which carrier sensing is used to sense the channel, and each node attempts to avoid collision by transmitting only when the channel has been sensed to be idle. For example, the CSMA/CA protocol may be a MAC protocol compliant to one of the IEEE 802.11 specifications. It is also used herein that "a state" of a computing device, such as an AP or a node, means a program state when the aforesaid computing device is operated under control of a program.

The present invention is obtained according to the disclosure above, in particular Sections A-C. Although the disclosure above predominantly refers to IEEE 802.11-compliant WLANs for illustration, the present invention is not limited only to these IEEE 802.11-compliant WLANs or any type of WLANs. The present invention is applicable to any wireless system using contention for enabling one or more nodes to communicate with an AP.

A first aspect of the present invention is to provide a contention-based method for enabling one or more nodes to communicate with an AP over a multiple-access channel. In the method, an individual node does not immediately initiate a procedure of contending for access to the channel when the individual node enters into a state of having at least one packet of data to be transmitted to the AP. This contending procedure is generally a part of a MAC protocol adopted by the AP and the one or more nodes. Instead, the individual node waits for a non-zero deterministic delay advantageously used for allowing any packet arrived during the delay to be aggregated and transmitted upon one transmission opportunity. The delay is determined by (19). After the delay expires, the individual node initiates the contending procedure.

A second aspect of the present invention is to provide a method for enabling one or more nodes to communicate with an AP over a multiple-access channel by contending among the one or more nodes for access to the channel according to a CSMA/CA protocol. The CSMA/CA protocol comprises a contending procedure for an individual node to contend for access to the channel. As an example, if the CSMA/CA protocol is compliant to one of the IEEE 802.11 specifications, then the contending procedure is a DCF procedure compliant to said one of the IEEE 802.11 specifications.

Exemplarily, the method is described as follows. When an individual node enters into a state of having at least one packet of data to be transmitted to the AP, the individual node waits for a non-zero deterministic delay to allow any packet arrived during the delay to be aggregated and transmitted upon one transmission opportunity. After the delay expires, the individual node initiates the contending procedure. Before starting the step of waiting, the individual node determines a value of the delay such that a predicted throughput of a wireless system, i.e. a predicted value of system throughput, is maximized, where the wireless system comprises the AP and the one or more nodes. As one example, the predicted value of system throughput may be computed by (14). As is discovered in Section D.1 above, the system throughput is significantly affected by the relationship between the deterministic delay and the number of one or more nodes. It follows that careful selection of a suitable deterministic delay is crucial in maximizing the system performance. Based on this observation, in the disclosed method, the delay is determined according to the number of the one or more nodes.

Preferably, the delay is determined by first determining an attempt rate such that the predicted throughput of the wireless system is maximized. The attempt rate may be computed by (18) to obtain an optimal attempt rate. The delay is then determined according to at least the determined attempt rate and the number of the one or more nodes.

It is also preferable that the delay is directly computed as the optimal deterministic delay given by (19). In one embodiment, a value of $\sigma=20$ µs is used in the computation of (19) if the wireless system is a WLAN compliant to an IEEE 802.11 specification.

The contending procedure may comprise an initial step of sensing the channel for a sensing duration of at least a pre-determined duration to determine if the channel has been idle over the sensing duration. If the contending procedure is the DCF procedure according to an IEEE 802.11 specification, the pre-determined duration is a DIFS as specified therein.

In the determination of the delay, the individual node is required to have a knowledge of the total number of nodes in the wireless system. To enable the individual node to acquire this knowledge, the AP may broadcast a message containing the number of the one or more nodes over the channel.

As one advantageous application the disclosed method, each of the embodiments thereof is applicable to a WLAN system comprising an AP and one or more nodes.

In the embodiments disclosed herein, an AP or a node may be implemented using general purpose or specialized computing devices, computer processors, or electronic circuitries including but not limited to digital signal processors, application specific integrated circuits, field programmable gate arrays, and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for enabling one or more nodes to communicate with an access point (AP) over a multiple-access channel by contending among the one or more nodes for access to the channel according to a carrier sense multiple access with collision avoidance (CSMA/CA) protocol, the protocol comprising a contending procedure for an individual node to contend for access to the channel, the method comprising:
    when the individual node enters into a state of having at least one packet of data to be transmitted to the AP, waiting, by the individual node, for a non-zero deterministic delay for allowing any packet arrived during the delay to be aggregated and transmitted upon one transmission opportunity;
    after the delay expires, initiating, by the individual node, the contending procedure; and
    before the individual node performs the waiting, determining, by the individual node, the delay such that a predicted throughput of a wireless system is maximized, the wireless system consisting of the AP and the one or more nodes, wherein the delay is determined according to the number of the one or more nodes.

2. The method of claim 1, wherein the determining of the delay comprises:
    determining an attempt rate such that the predicted throughput of the wireless system is maximized; and
    determining the delay according to at least the determined attempt rate and the number of the one or more nodes.

3. A wireless local area network (WLAN) system comprising:
    an access point (AP); and
    one or more nodes for communicating with the AP over a multiple-access channel by contending among the one or more nodes for the channel according to a carrier sense multiple access with collision avoidance (CSMA/CA) protocol, the protocol comprising a contending procedure for an individual node to contend for the channel;
    wherein the one or more nodes and the AP are configured to execute a process of the one or more nodes communicating with the AP over the channel according to the method of claim 2.

4. The method of claim 1, wherein the delay, denoted by d, is determined by $$d = \bar{\Omega}(\beta) \left[ \frac{\frac{1+\gamma+\ldots+\gamma^{M-1}}{\beta} -}{(b_0 + \gamma b_1 + \gamma^2 b_2 + \ldots + \gamma^{M-1} b_{M-1})} \right]$$

where:

$\beta = n^{-1}[W_0(-\eta/e)+1]$, in which $W_0(\cdot)$ is one branch of the Lambert $W(z)$ function, and $e \approx 2.718281828$ is Euler's number;

$$\gamma = 1 - (1-\beta)^{n-1};$$

$$\bar{\Omega}(\beta) = \sigma + T_s \times P_s(\beta) + T_{\bar{s}} \times P_{\bar{s}}(\beta), \text{ in which}$$

$$P_s(\beta) = n\beta(1-\beta)^{n-1} \text{ and } P_{\bar{s}}(\beta) = 1 - (1-\beta)^n - P_s(\beta);$$

$$\eta = 1 - \sigma/T_s;$$

n is the number of the one or more nodes;
σ is a duration of one time slot used in the CSMA/CA protocol;
$T_s$ is a mean time for a successful transmission;
$T_{\bar{s}}$ is a mean time for an unsuccessful transmission;
M is a maximum number of attempts of transmitting one packet by the individual node according to the CSMA/CA protocol; and
$b_i$, $i \in \{0, \ldots, M-1\}$, is a mean value of randomly selected backoff count at the ith backoff stage, which is a backoff stage immediately before the (k+1)th attempt.

5. The method of claim 4, wherein σ=20 µs.

6. A wireless local area network (WLAN) system comprising:
an access point (AP); and
one or more nodes for communicating with the AP over a multiple-access channel by contending among the one or more nodes for the channel according to a carrier sense multiple access with collision avoidance (CSMA/CA) protocol, the protocol comprising a contending procedure for an individual node to contend for the channel;
wherein the one or more nodes and the AP are configured to execute a process of the one or more nodes communicating with the AP over the channel according to the method of claim 5.

7. A wireless local area network (WLAN) system comprising:
an access point (AP); and
one or more nodes for communicating with the AP over a multiple-access channel by contending among the one or more nodes for the channel according to a carrier sense multiple access with collision avoidance (CSMA/CA) protocol,
the protocol comprising a contending procedure for an individual node to contend for the channel;
wherein the one or more nodes and the AP are configured to execute a process of the one or more nodes communicating with the AP over the channel according to the method of claim 4.

8. The method of claim 1, wherein the CSMA/CA protocol is compliant to one of the IEEE 802.11 specifications.

9. The method of claim 8, wherein the contending procedure is a distributed coordination function (DCF) procedure compliant to said one of the IEEE 802.11 specifications.

10. A wireless local area network (WLAN) system comprising:
an access point (AP); and
one or more nodes for communicating with the AP over a multiple-access channel by contending among the one or more nodes for the channel according to a carrier sense multiple access with collision avoidance (CSMA/CA) protocol,
the protocol comprising a contending procedure for an individual node to contend for the channel;
wherein the one or more nodes and the AP are configured to execute a process of the one or more nodes communicating with the AP over the channel according to the method of claim 9.

11. A wireless local area network (WLAN) system comprising:
an access point (AP); and
one or more nodes for communicating with the AP over a multiple-access channel by contending among the one or more nodes for the channel according to a carrier sense multiple access with collision avoidance (CSMA/CA) protocol, the protocol comprising a contending procedure for an individual node to contend for the channel;
wherein the one or more nodes and the AP are configured to execute a process of the one or more nodes communicating with the AP over the channel according to the method of claim 8.

12. The method of claim 1, wherein the contending procedure comprises an initial step of sensing the channel for a sensing duration of at least a pre-determined duration to determine if the channel has been idle over the sensing duration.

13. The method of claim 12, wherein:
the CSMA/CA protocol is compliant to one of the IEEE 802.11 specifications;
the contending procedure is a distributed coordination function (DCF) procedure compliant to said one of the IEEE 802.11 specifications; and
the pre-determined duration is a DCF interframe space (DIFS) given by said one of the IEEE 802.11 specifications.

14. A wireless local area network (WLAN) system comprising:
an access point (AP); and
one or more nodes for communicating with the AP over a multiple-access channel by contending among the one or more nodes for the channel according to a carrier sense multiple access with collision avoidance (CSMA/CA) protocol, the protocol comprising a contending procedure for an individual node to contend for the channel;
wherein the one or more nodes and the AP are configured to execute a process of the one or more nodes communicating with the AP over the channel according to the method of claim 13.

15. A wireless local area network (WLAN) system comprising:
an access point (AP); and
one or more nodes for communicating with the AP over a multiple-access channel by contending among the one or more nodes for the channel according to a carrier sense multiple access with collision avoidance (CSMA/CA) protocol, the protocol comprising a contending procedure for an individual node to contend for the channel;

wherein the one or more nodes and the AP are configured to execute a process of the one or more nodes communicating with the AP over the channel according to the method of claim 12.

16. The method of claim 1, further comprising:
broadcasting, by the AP, a message containing the number of the one or more nodes over the channel to thereby enable the individual node to determine the delay.

17. A wireless local area network (WLAN) system comprising:
an access point (AP); and
one or more nodes for communicating with the AP over a multiple-access channel by contending among the one or more nodes for the channel according to a carrier sense multiple access with collision avoidance (CSMA/CA) protocol, the protocol comprising a contending procedure for an individual node to contend for the channel;
wherein the one or more nodes and the AP are configured to execute a process of the one or more nodes communicating with the AP over the channel according to the method of claim 16.

18. A wireless local area network (WLAN) system comprising:
an access point (AP); and
one or more nodes for communicating with the AP over a multiple-access channel by contending among the one or more nodes for the channel according to a carrier sense multiple access with collision avoidance (CSMA/CA) protocol, the protocol comprising a contending procedure for an individual node to contend for the channel;
wherein the one or more nodes and the AP are configured to execute a process of the one or more nodes communicating with the AP over the channel according to the method of claim 1.

19. A method for enabling one or more nodes to communicate with an access point (AP) over a multiple-access channel by contending among the one or more nodes for access to the channel, the method comprising:
when an individual node enters into a state of having at least one packet of data to be transmitted to the AP, waiting, by the individual node, for a non-zero deterministic delay for allowing any packet arrived during the delay to be aggregated and transmitted upon one transmission opportunity; and
after the delay expires, initiating, by the individual node, a procedure of contending for access to the channel;
wherein the delay, denoted by d, is determined by $$d = \bar{\Omega}(\beta)\left[\frac{\frac{1+\gamma+\ldots+\gamma^{M-1}}{\beta} - }{(b_0 + \gamma b_1 + \gamma^2 b_2 + \ldots + \gamma^{M-1} b_{M-1})}\right]$$

where:
$\beta = n^{-1}[W_0(-\eta/e)+1]$, in which $W_0(\cdot)$ is one branch of the Lambert W(z) function, and $e \approx 2.718281828$ is Euler's number;

$\gamma = 1 - (1-\beta)^{n-1}$;

$\bar{\Omega}(\beta) = \sigma + T_s \times P_s(\beta) + T_{\bar{s}} \times P_{\bar{s}}(\beta)$, in which $P_s(\beta) = n\beta(1-\beta)^{n-1}$ and $P_{\bar{s}}(\beta) = 1 - (1-\beta)^n - P_s(\beta)$;

$\eta = 1 - \sigma/T_s$;

n is the number of the one or more nodes;
σ is a duration of one time slot used in the CSMA/CA protocol;
$T_s$ is a mean time for a successful transmission;
$T_{\bar{s}}$ is a mean time for an unsuccessful transmission;
M is a maximum number of attempts of transmitting one packet by the individual node according to the CSMA/CA protocol; and
$b_i$, i∈{0, ..., M−1}, is a mean value of randomly selected backoff count at the ith backoff stage, which is a backoff stage immediately before the (k+1)th attempt.

20. The method of claim 19, wherein σ=20 μs.

* * * * *